…

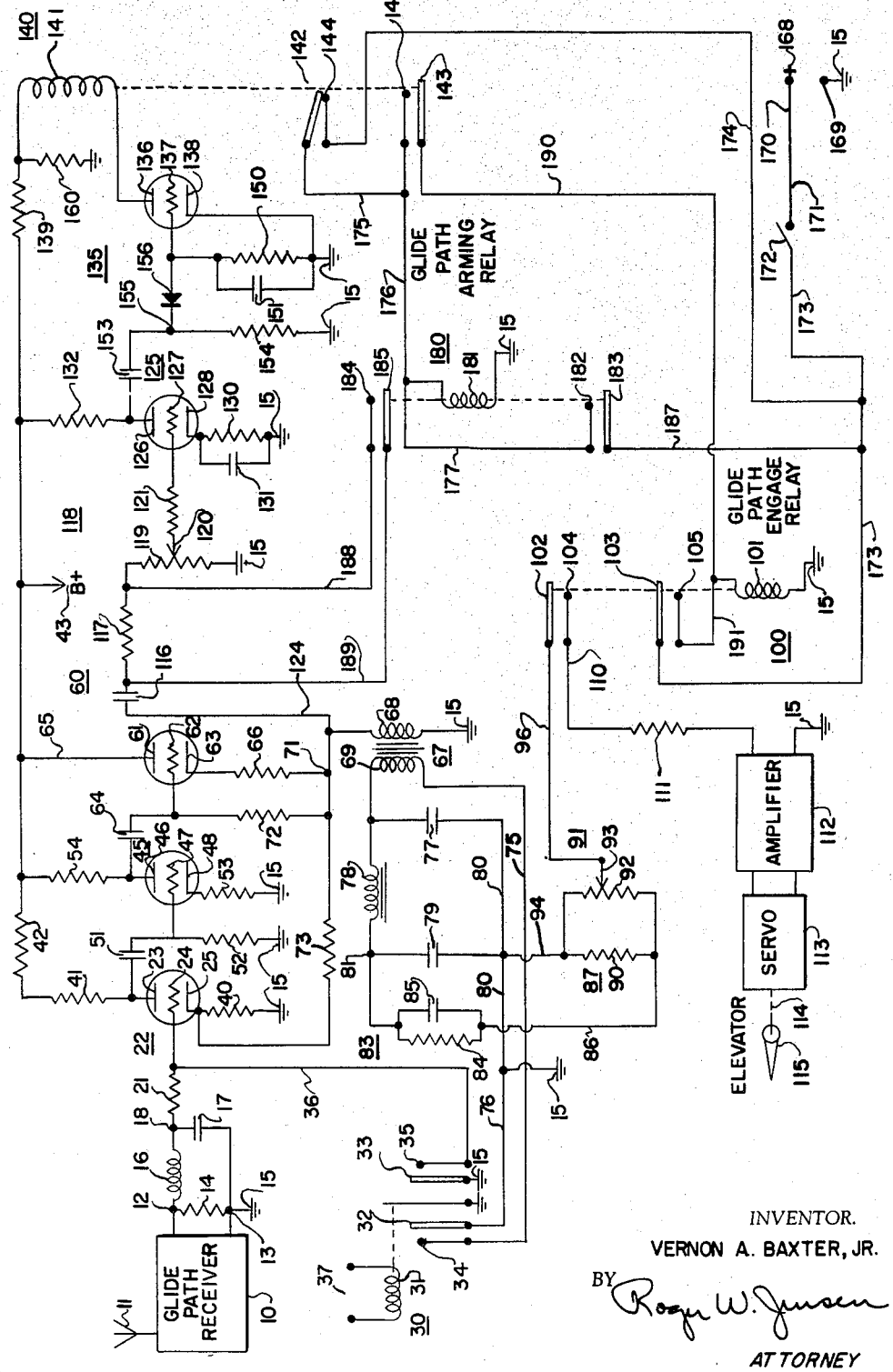

United States Patent Office 2,950,077
Patented Aug. 23, 1960

2,950,077

CONTROL SYSTEMS FOR DIRIGIBLE CRAFT

Vernon A. Baxter, Jr., Hopkins, Minn., assignor to Minneapolis-Honeywell Regulator Company, Minneapolis, Minn., a corporation of Delaware Filed July 16, 1957, Ser. No. 672,213

6 Claims. (Cl. 244—77)

This invention generally pertains to automatic control apparatus for dirigible craft and more specifically to automatic engaging means for an instrument landing system for an aircraft.

As is well known by those skilled in the art, radio transmitters are provided adjacent to airports which transmit doubly modulated signals which define a pair of beams. A first beam arrangement is provided for defining a so-called "localizer path" so as to serve as a reference to aircraft in azimuth and a second beam is provided for defining a "glide path" so as to serve as a reference to aircraft in elevation. The customary arrangement is for the localizer path information to be used first so as to orient the plane correctly in the horizontal plane relative to the airport and then in addition as the glide path is approached to utilize its information so as to descend at the proper angle. Sometimes this localizer path and glide path information is used to operate an indicator which the pilot observes in manually controlling the aircraft, and sometimes the information is used to energize a coupler which may be engaged with automatic pilot means for automatically controlling the aircraft.

Previously in connection with using the information to energize a coupler it has been proposed to provide means for automatically initiating control of the automatic pilot in accordance with the glide path information once the aircraft reached or nearly reached the center of the glide path. This is called "engaging" glide path control. However, for various reasons, these prior art arrangements are not perfectly satisfactory.

The present invention is concerned with an improved automatic engaging means for an instrument landing system for an aircraft which includes an automatic pilot. More specifically the present invention provides an apparatus for automatically coupling beam information to the autopilot when the aircraft reaches a predetermined position in the beam. The embodiment shown is apparatus for automatically coupling the glide path information to the autopilot upon the aircraft reaching the center or near center of the glide path. The teaching of the invention may be applied to automatically engaging any other radio beam such as the localizer beam. The teaching may also be applied to the automatic engagement upon a certain predetermined beam strength being reached relative to the strength of the beam at its center. In other words the apparatus may be adjusted so that engagement will occur prior to the center of the beam being reached.

An object of this invention therefore is to provide an improved control apparatus for dirigible craft.

A further object of the invention is to provide an improved automatic instrument landing system for a dirigible craft.

Other and more specific objects of the invention, including constructional details and the operation of control systems embodying my invention, will be set forth more fully in and become apparent from a reading of the following specification and appended claims, in conjunction with the accompanying drawing in which is shown a system for automatically connecting a glide slope receiver to a servomotor which controls the elevator of an aircraft.

Referring to the drawing, numeral 10 represents a glide path receiver. Such receivers are well known by those skilled in the art and need not be shown in detail. Antenna means 11 have induced therein signals from radio waves which signals are applied to the glide path receiver 10 which develops a D.C. signal at a pair of output terminals 12 and 13 of one polarity or the other according to the sense of the displacement of the aircraft away from the center of the glide path, and of a magnitude proportional to the distance away from the center of the glide path. This signal is applied across a resistor 14 which is connected between terminals 12 and 13, and terminal 13 is also grounded at 15. The signal is then applied through a low pass filter including an inductance 16 and a capacitor 17 connected in series between points 12 and 13, the common point between inductance 16 and capacitance 17 being identified by reference numeral 18. A coupling resistor 21 is connected between junction point 18 and the grid 24 of a triode vacuum tube 22 which serves as a first stage of amplification for the signal. The D.C. signal applied to grid 24 is interrupted by a chopper generally identified by reference numeral 20 and including a coil member 31 which actuates movable contact means 32 and 33 with respect to fixed contact means 34 and 35. Contact 35 is connected through a lead 36 to grid 24 and its coacting movable contact member 33 is grounded at 15. Coil 31 is energized from a suitable source of alternating current 37 and as is well understood movable contact members 32 and 33 vibrate synchronously with the alternating current energization to the coil 31 so that contact is made and broken between contacts 32 and 34 and between contacts 33 and 35 at a fixed rate. The effect of grid 24 being grounded intermittently is to chop the D.C. signal applied to the grid 24 so that the signal in effect becomes a square wave type of alternating current. Triode 22 has a cathode 25 which is connected to ground 15 through a cathode resistor 40 and has a plate 23 which is connected through suitable connection means, a plate impedance 41 and a voltage dropping resistor 42, to a suitable source of positive direct current 43.

Triode 22 is connected to a second stage of amplification including a second triode generally identified by the reference numeral 45 and comprising a plate 46, a grid 47 and a cathode 48. The triode 45 receives a signal from the first stage of amplification through an RC network including a condenser 51 and a resistor 52. Resistor 52 is connected between grid 47 and ground 15 and condenser 51 is connected between the plate 23 of triode 22 and grid 47 of triode 45. The cathode 48 of triode 45 is connected to ground 15 through a resistance 53, the plate 46 of triode 45 is connected to the source 43 through a plate impedance 54. Triode 45 serves to amplify the signal additionally and its output is applied to a cathode follower stage including a triode generally identified by the reference numeral 60 and including a plate 61, a grid 62 and a cathode 63. A condenser 64 connects the plate 46 of triode 45 to the grid 62 of triode 60 and a suitable connecion means 65 connects plate 61 of triode 60 to the source 43. Connected in series between the cathode 63 of triode 60 and ground 15 are a resistance 66 and the primary winding 68 of a coupling transformer 67, their common junction point being identified at a reference numeral 71. A suitable resistance 72 is connected between grid 62 of triode 60 and junction point 71, and an additional resistance 73 is connected between point 71 and cathode 25 of the triode 22. This latter connection provides a negative feedback to the first stage of amplification for stabilizing purposes.

Transformer 67 includes a secondary winding 69 which has induced therein an alternating current signal proportional in phase and magnitude to the sense and magnitude of the D.C. signal produced by the glide path receiver 10. One side of the secondary winding 69 is connected through a lead 75 to fixed contact 34 of the chopper or synchronous vibrator 30. The movable contact 32 which cooperates with fixed contact 34 of chopper 30 is connected through a suitable lead 76 to ground 15. A condenser 77 and a lead 80 connect the other side of the secondary winding 69 to ground 15. The purpose of the connection of the secondary winding 69 through contacts 34 and 32 of the chopper 30 is to demodulate the alternating current signal to a direct current signal which is further filtered by a network including an inductance 78 and a condenser 79. Inductance 78 and condenser 79 are connected in series between the other side of secondary winding 69 and ground 15, their common point being identified by reference number 81. The D.C. signal is then applied through a lead network 83 including a resistance 84 and a capacitor 85 of suitable size connected in parallel, one side of the parallel combination being connected to junction point 81 and the other side being connected by a suitable lead 86 to one side of a resistance network generally identified by the reference numeral 87.

Network 87 includes a resistance 90 connected in parallel with the resistance portion 92 of a potentiometer 91 which also includes a wiper member 93. Lead 86 is connected to one side of paralleled resistances 90 and 92 and the other side thereof is connected by a suitable lead 94 to ground 15. The A.C. signal induced in secondary winding 69 is demodulated into a D.C. signal which is filtered, further modified by the lead network 83 and then applied across the resistance network 87, and a signal is therefore produced at wiper 93 according to its position relative to resistance portion 92. The signal is applied through a suitable lead 96 to the movable contact 102 of a glide path engage relay 100 which comprises a coil 101, grounded at one side at 15, and a pair of movable contacts 102 and 103 which coact respectively with fixed contacts 104 and 105. When glide path relay 100 is energized as will be described below, movable contact 102 is moved into engagement with fixed contact 104 supplying the D.C. glide path signal through a suitable lead 110 and a summing resistor 111 to the input of an amplifier 112 of suitable design. The amplifier 112 is also grounded at 15 to complete the circuit, and serves to amplify the D.C. signal and apply it through suitable connection means to a servomotor 113 which is of any desired type, and which is connected through a connection 114 to the elevator 115 of a dirigible craft (not shown). It will be appreciated that displacement of the elevator 115 relative to the aircraft will tend to cause the aircraft to rotate about its pitch axis so as to change its pitch attitude.

The alternating current signal produced by the cathode follower including triode 60 is not only applied to primary winding 68 of transformer 67 but it is also applied to a circuit which serves to automatically energize relay 100 when the aircraft reaches a point in the radio beam having a predetermined signal strength. The alternating current signal at junction point 71 is applied through a suitable lead 124 and an RC coupling network to the grid 127 of a triode amplifier 125 having a cathode 128 and a plate 126. The coupling network includes a condenser 116, a resistance 117, and the resistance portion 119 of a potentiometer 118, connected in series between junction point 71 and ground. Potentiometer 118 includes a wiper member 120 which is connected through a suitable resistance 121 to grid 127 of triode 125. Resistance 117 is selected so that it is normally considerably higher in impedance than the resistance portion 119 of the potentiometer 118.

Cathode 128 of triode 125 is connected to ground 15 through a suitable cathode resistor 130 having in parallel therewith a suitable cathode condenser 131. Plate 126 of triode 125 is connected to the source 43 through a plate load resistor 132. The alternating current signal applied to grid 127 of triode 125 is amplified by the foregoing arrangement and is applied to the grid 137 of a triode 135 which is part of an output stage. Triode 135 also includes a plate member 136 and a cathode 138. In the plate circuit of triode 135 is the winding 141 of a glide path sensing relay 140. One side of winding 141 is connected to plate 136 and the other side is connected through a dropping resistor 139 to the source 43. Glide path sensing relay 140 also includes a pair of movable contact members 142 and 143 which coact respectively with fixed contacts 144 and 145. When relay 140 is de-energized movable contact member 142 is normally in engagement with its fixed contact 144 and movable contact member 143 is normally out of engagement with its fixed contact 145.

Cathode 138 of triode 135 is grounded at 15. A resistance member 150 and a condenser 151 are arranged in parallel and connected between grid 137 of triode 135 and ground 15. A condenser 153 and a resistor 154 are connected in series between plate 126 of triode 125 and ground 15, and having a common junction point 155. A rectifier 156 is connected between junction point 155 and grid 137 of triode 135.

The design of the output stage including triode 135 is such that when no signal is applied to its grid 137 the tube normally conducts so as to energize or actuate the winding 141 of the glide path sensing relay 140. This corresponds to the condition when no glide path signal is being received.

A resistor 160 is connected at one end to ground 15 and at the other end to the common point between resistor 139 and winding 141 in the plate circuit of triode 135. Resistance 160 serves the purpose of reducing the voltage applied to plate 136 of triode 135.

A pair of terminals 169 and 170 are provided, terminal 169 being grounded at 15 and terminal 170 being connected to a source of suitable positive direct current 168. A lead 171 connects terminal 170 to one side of a switch 172 which is normally open and which is closed when the automatic glide path engagement means is to be used. The other side of switch 172 is connected by a lead 173 to the movable contact 103 of the glide path engage relay 100. The other side of switch 172 is also connected through lead 173 and a further additional lead 174 to the fixed contact 144 of the glide path sensing relay 140. The movable contact 142 which coacts with fixed contact 144 is connected by a lead 175 to fixed contact 145 of the glide path sensing relay 140. Fixed contact 145 is also connected through a suitable lead 176 to one side of a winding 181 of a glide path arming relay 180, the other side of which is grounded at 15. The ungrounded side of winding 181 is also connected through a lead 177 to a fixed contact 182 of the glide path arming relay 180, contact 182 having coacting therewith a movable contact member 183. The contacts 182 and 183 are normally out of engagement when the relay 180 is de-energized. The glide path arming relay also includes a fixed contact 184 and a coacting movable contact 185 which also are normally out of engagement when the glide path arming relay is de-energized. Fixed contact 184 and movable contact 185 are connected respectively through suitable leads 188 and 189 to opposite sides of resistor 117 in the input circuit of triode 125. When the glide path arming relay 180 is energized, contacts 184 and 185 are in engagement and resistor 117 is shorted out and thus effectively removed from the input circuit of triode 125.

The movable contact 143 of the glide path sensing relay is connected through a suitable lead 190 to one side of the glide path engage relay winding 101, the other side of which is grounded as at 15. The ungrounded side of winding 101 is also connected through a lead 191 to the fixed contact 105 of the relay 100. Movable contacts 102 and 103 of the glide path engage relay 100 are normally held out of engagement with their respective fixed contacts 104 and 105 when the winding 101 is de-energized.

Operation

Under normal operation switch 172 remains open until the localizer mode of automatic operation (not shown) has been established. Prior to this time the aircraft is controlled in pitch either manually or by having the elevator 115 controlled through the servomotor and the amplifier 112 by automatic pilot means which well may include signal sources comprising a vertical reference such as a vertical gyro, and also a rate gyro, an accelerometer, and an altitude control which may give signals proportional to both altitude displacement and altitude rate. Triodes 22, 45, 60, 125, and 135 are all properly energized, by means not shown, and power is applied to the plates thereof through the source of potential 43. At this time no appreciable signal is sensed by antenna 11 associated with the glide path receiver 10. Accordingly no signals except noise signals are applied to triode 22. Under this condition substantially no signal is applied to triode 125 and accordingly triode 135 is conducting so as to energize the glide path sensing relay 140. Thus movable contact 142 is held out of engagement with its fixed contact 144 and movable contact 143 is held into engagement with its fixed contact 145. Extraneous signals such as noise may be transmitted through triodes 22 and 45 and appear at junction point 71. These extraneous signals however are not appreciably effective in triodes 125 and 135 due to the fact that resistance member 117 is considerably larger than the resistance portion 119 of the potentiometer 118.

As the aircraft begins to come into the glide path beam the signal as sensed by the antenna 11 increases to a quite large value, and it again diminishes to zero as the aircraft reaches the very center of the glide path. When the localizer mode of automatic control is selected, as mentioned above, switch 172 is closed. The glide path signal is of quite a large magnitude. It is chopped into a square wave and amplified as a square wave through triodes 22 and 45 and applied to the cathode follower including the triode 60. The A.C. signal is applied to the coupling transformer 67, is demodulated by chopper contacts 32 and 34 and is then applied through the lead network 83 across the resistance member 92 of the potentiometer 91. However, since the glide path engage relay 100 is de-energized this glide path signal cannot be applied to the amplifier 112.

The substantial A.C. signal present at junction point 71, which corresponds to a substantial glide path signal being received and amplified by receiver 10, is applied to grid 127 of triode 125 through the series combination of condenser 116, resistor 117 and the resistance portion 119 of potentiometer 118. Triode 125 is normally operated as a class A amplifier, and when no signal is applied to grid 127 thereof, the voltage at plate 126 remains substantially constant. As is well understood, when a signal is applied to grid 127, the voltage at plate 126 varies proportionately. Coupling condenser 153 between plate 126 of triode 125 and triode 135 blocks any D.C. signals from being applied to triode 135 but passes any A.C. or transient signals. The portion of the A.C. signal present at junction point 71 that is actually applied to grid 127 of triode 125 is a function of the relative sizes of resistor 117 and the resistance portion 119 of potentiometer 118 and also is a function of the position of wiper 120 relative to resistance portion 119. Prior to energization of the glide path arming relay 180, most of the signal is dropped across resistor 117.

As the A.C. signal is applied to grid 127 of triode 125 the alternating plate voltage at plate 126 thereof also varies, the plate voltage fluctuating 180° out of phase with the signal applied to grid 127. The A.C. variations at plate 126 are connected through condenser 153 and resistor 154 to ground. The rectifier 156 offers a high impedance to fluctuations of the plate voltage of one sense but offers a low impedance to fluctuations of the plate voltage in the opposite sense. Thus when the plate voltage decreases rectifier 156 permits current to flow through the parallel combination of resistor 150 and condenser 151 in the grid circuit of triode 135. The effect of this is to develop a negative voltage at grid 137 of triode 135. The greater the variation in plate voltage at plate 126 of triode 125 becomes, the greater is the negative voltage developed at grid 137 of triode 135. At or beyond a certain critical point of variation in plate voltage at triode 125, a sufficient negative voltage is developed at grid 137 of triode 135 to cause triode 135 to cease conducting.

Thus tube 135 ceases to conduct in response to a strong signal being received by the glide path receiver 10. Accordingly the glide path sensing relay 140 becomes de-energized thus allowing its movable contact 142 to revert to its normal de-energized position of being in contact with its cooperating fixed contact 144. Since switch 172 has previously been closed in connection with localizer operation, positive voltage from source 168 is applied through leads 173 and 174 to the fixed contact 144 and thence through movable contact 142 of the glide path sensing relay 140 and through leads 175 and 176 to the ungrounded side of the winding 181 of the glide path arming relay 180. Thus the glide path arming relay winding 181 is energized and it causes the displacement of movable contacts 183 and 185 into engagement with fixed contacts 182 and 184 respectively. The effect of movable contact 183 engaging fixed contact 182 is to provide a holding circuit for the glide path arming relay 180, the movable contact 183 being connected to the load side of switch 172 through a suitable lead 187, and the fixed contact 182 being connected to winding 181 through a suitable lead 177. Thus, even though the glide path sensing relay 140 is subsequently energized, thus breaking the connection between its movable contact member 142 and its fixed contact member 144, the glide path arming relay 180 remains energized.

The effect of the movable contact member 185 engaging with the fixed contact member 184 is to shunt resistance 117 out of the grid circuit of triode 125. As is indicated above this is accomplished by having opposite sides of resistance member 117 connected to contacts 184 and 185 through connection leads 188 and 189. The effect of shunting resistance member 117 is to increase the sensitivity of the circuit once a strong signal has been received. This arrangement insures that any random noise picked up by the glide path receiver 10 prior to the actual entering the glide path zone will not serve to apply a signal of sufficient strength to triode 125 so as to cause the output triode 135 to stop conducting sufficiently to drop out the glide path sensing relay 140.

As the aircraft passes through the zone of glide path radio energy going towards the center of the glide path, the magnitude of the signal that the glide path receiver senses decreases towards zero. Once the signal decreases to zero or near zero the triode 135 no longer receives sufficient negative biasing through the action of rectifier 156 and condenser 151 and hence can once again conduct, energizing the glide path sensing relay 141. Thus movable contact 142 is moved out of engagement with fixed contact 144 and movable contact 143 engages fixed contact 145. Fixed contact 145 now is energized from the source of positive potential 168 through terminal 170, connection lead 171, switch 172, lead 173, lead 187, movable contact 183 and fixed contact 182 of the glide path arming relay 180, lead 177, and lead 176. Thus when the glide path sensing relay 140 is re-energized corresponding to the aircraft being at or near the center of the glide path, the energization from terminal 170 is applied through the above described circuit to terminal 145 and thence through movable contact 143 and connection lead 190 to the ungrounded side of winding 101 of the glide path engage relay 100. Glide path engage relay 100 is thus energized causing its movable contacts 102 and 103 to be moved into engagement with its fixed contacts 104 and 105 respectively. The effect of movable contact 103 engaging fixed contact 105 is to complete a holding circuit for the glide path engage relay 100, and the effect of the engagement of fixed contact 104 by movable contact 102 is to connect the amplifier 112 to potentiometer 91 so as to apply the glide path signal ultimately to the elevator 115. Thereafter any deviation of the aircraft away from the center of the glide path results in a signal of proper polarity and magnitude being sensed by the glide path receiver and applied through the means described above so as to control the amplifier and drive the servo and elevator 115 in the proper sense so as to bring the aircraft back to the center of the glide path.

The automatic glide path engagement means described above will serve to automatically and accurately engage the glide path receiver to the amplifier 112 upon the center of the glide path being reached by the aircraft. The system is reliable and free from the disadvantages of the prior art systems. As long as no substantial glide path signal is received by the glide path receiver 10 the glide path sensing relay 140 remains energized and prevents the glide path arming relay 180 from being energized. Only after a strong glide path signal has been received indicating that the aircraft has entered the effective zone of the glide path does the glide path sensing relay 140 drop out thus permitting the energization of the glide path arming relay 180. Then, before the glide path engage relay 100 can be energized it is necessary to have the glide path sensing relay 140 once again energized thus indicating the aircraft is at or near the center of the glide path. It will be appreciated therefore that it is necessary to have the glide path sensing relay 140 first energized, then deenergized, and then re-energized in order to cause the glide path engage relay 100 to be energized.

In the above discussion, it has been pointed out that the glide path sensing relay 140 is re-energized when the aircraft nears the center of the glide path, the re-energization of relay 140 then causing the glide path engage relay 100 to be energized so as to couple the glide path signal to the amplifier 112. It will be appreciated that the actual point at which the glide path sensing relay 140 is re-energized is a function of the relationship between the size of resistance portion 119 of potentiometer 118 and the size of fixed resistance 117, as well as of the position of wiper member 120 relative to resistance member 119 of the potentiometer 118. Thus by proper adjustment of these elements the point at which the glide path engage relay 100 is energized may be varied. Further the aircraft may be quite close to the center of the glide path or relatively far from the center of the glide path at the time of engagement. In practice it has been found desirable to engage the glide path just shortly before the aircraft reaches the center of the glide path. It has further been found desirable to automatically engage the localizer path a considerable distance away from the center of the localizer path.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. In a system for controlling a dirigible craft so as to follow a radio beam wherein said craft has a plurality of axes about which said craft may be displaced, controlled means for causing said craft to rotate about one of said axes, and motor means operatively connected to said controlled means, in combination: control signal producing means; and means selectively connecting said control signal producing means to said motor means to operate said controlled means comprising engage relay means having contacts which when closed complete the connection of said signal producing means to said motor means, sensing relay means, means controlling said sensing relay means in response to the signal from said signal producing means so that said sensing relay means is energized when said signal is less in magnitude than a predetermined amount and so that said sensing relay means is de-energized when said signal is greater in magnitude than a predetermined amount, arming relay means, means energizing said arming relay means when said sensing relay means is de-energized, and means including said sensing and arming relay means for energizing said engage relay means after said arming and said sensing relay means have been energized in sequence.

2. In an automatic glide path engaging system for a dirigible craft having roll, pitch and yaw axes about which said craft may be displaced, controlled means for causing said craft to rotate about said pitch axis, and motor means operatively connected to said controlled means, in combination: control signal producing means; and means for connecting and disconnecting said control signal producing means to said motor means to control the operation of said motor means comprising first relay means having contacts which when closed complete the connection of said signal producing means to said motor means, second relay means, means controlling said second relay means in response to the signal from said signal producing means so that said second relay means is energized when said signal is less in magnitude than a predetermined amount and so that said second relay means is de-energized when said signal is greater in magnitude than a predetermined amount, third relay means, means energizing said third relay means when said second relay means is de-energized, and means including said second and third relay means for energizing said first relay means after said third and second relay means have been energized in sequence.

3. In a control system for a dirigible craft having a plurality of axes about which said craft may be displaced, controlled means for causing said craft to rotate about one of said axes, and motor means operatively connected to said controlled means, in combination: control signal producing means; and means selectively connecting said control signal producing means to said motor means to operate said controlled means comprising first relay means having contacts which when closed complete the connection of said signal producing means to said motor means, second relay means, means controlling said second relay means in response to the signal from said signal producing means so that said second relay means is energized when said signal is less in magnitude than a predetermined amount and so that said second relay means is de-energized when said signal is greater in magnitude than a predetermined amount, third relay means, means energizing said third relay means when said second relay means is de-energized, and means including said second and third relay means for energizing said first relay means after said third and said second relay means have been energized in sequence.

4. In a control system for a dirigible craft having a plurality of axes about which said craft may be displaced, controlled means for causing said craft to rotate about one of said axes, and motor means operatively connected to said controlled means, in combination: control signal producing means; and means selectively connecting said control signal producing means to said motor means to operate said controlled means comprising first relay means which when energized completes the connection of said signal producing means to said motor means, second relay means, means controlling said second relay means in response to the signal from said signal producing means so that said second relay means is energized when said signal is less in magnitude than a predetermined amount and so that said second relay means is de-energized when said signal is greater in magnitude than a predetermined amount, third relay means, means energizing said third relay means when said second relay means is de-energized, and means including said second and third relay means for energizing said first relay means after said third and said second relay means have been energized in sequence.

5. In a control system for a dirigible craft having a plurality of axes about which said craft may be displaced, controlled means for causing said craft to rotate about one of said axes, and motor means operatively connected to said controlled means, in combination: control signal producing means; and means selectively connecting said control signal producing means to said motor means to operate said controlled means comprising operable connection means which when operated completes the connection of said signal producing means to said motor means; signal responsive means, means controlling said signal responsive means in response to the signal from said signal producing means so that said signal responsive means is energized when said signal is less in magnitude than a predetermined amount and so that said signal responsive means is de-energized when said signal is greater in magnitude than a predetermined amount, third means, means energizing said third means when said signal responsive means is de-energized, and means including said signal responsive means and said third means for operating said operable connection means after said third means and said signal responsive means have been energized in sequence.

6. In a control system for a dirigible craft having a plurality of axes about which said craft may be displaced, controlled means for causing said craft to rotate about one of said axes, and motor means operatively connected to said controlled means, in combination: control signal producing means; actuating switch means operable to connect said signal producing means to said motor means; arming switch means operative to prepare a circuit for said actuating switch means; signal responsive switch means connected to said signal producing means for completing a circuit to said arming switch means when said signal is large, and for completing the first named circuit when said signal is small; a source of electrical energy for said switch means and said first named circuit; and manually operable means normally cutting off said source from said switch means and said first named circuit.

References Cited in the file of this patent

UNITED STATES PATENTS 2,801,059    Hecht et al. _____ July 30, 1957